United States Patent [19]

Louw et al.

[11] 3,877,629

[45] Apr. 15, 1975

[54] HIGH SPEED ROTOR FOR FRICTION WELDING SYSTEMS

[75] Inventors: Johan A. Louw, Orange; Robert E. Ghiselin, Newport, both of Calif.

[73] Assignee: Textron Inc., Santa Ana, Calif.

[22] Filed: Oct. 16, 1972

[21] Appl. No.: 298,177

[52] U.S. Cl. .................. 228/2; 310/212; 310/217; 310/262
[51] Int. Cl.. B23k 27/00; H02k 17/18; H02k 17/22
[58] Field of Search .......... 228/2; 29/470.3; 156/73; 310/211, 212, 261, 262, 216, 217

[56] References Cited
UNITED STATES PATENTS

| | | | |
|---|---|---|---|
| 921,505 | 5/1909 | Behrend | 310/262 |
| 1,010,998 | 12/1911 | Williamson | 310/262 |
| 1,894,273 | 1/1933 | Hunziker | 310/262 |
| 2,064,033 | 12/1936 | Rose | 310/262 |
| 3,458,101 | 7/1969 | Martin | 228/2 |
| 3,502,924 | 3/1970 | Staebler | 310/262 X |
| 3,610,507 | 10/1971 | Kiwalle | 228/2 |
| 3,613,982 | 10/1971 | Hallenberg et al. | 228/2 |

Primary Examiner—Francis S. Husar
Assistant Examiner—Gus T. Hampilos
Attorney, Agent, or Firm—Harvey C. Nienow

[57] ABSTRACT

A high speed induction motor having a motor provided with a tension rod through the center of the laminations and end supports. Said tension rod being under unusually high tensile force to cause the laminations to be placed in compression and thereby to act as structural members for providing rigidity to the rotor with minimum vibrations at unusually high speeds.

4 Claims, 4 Drawing Figures

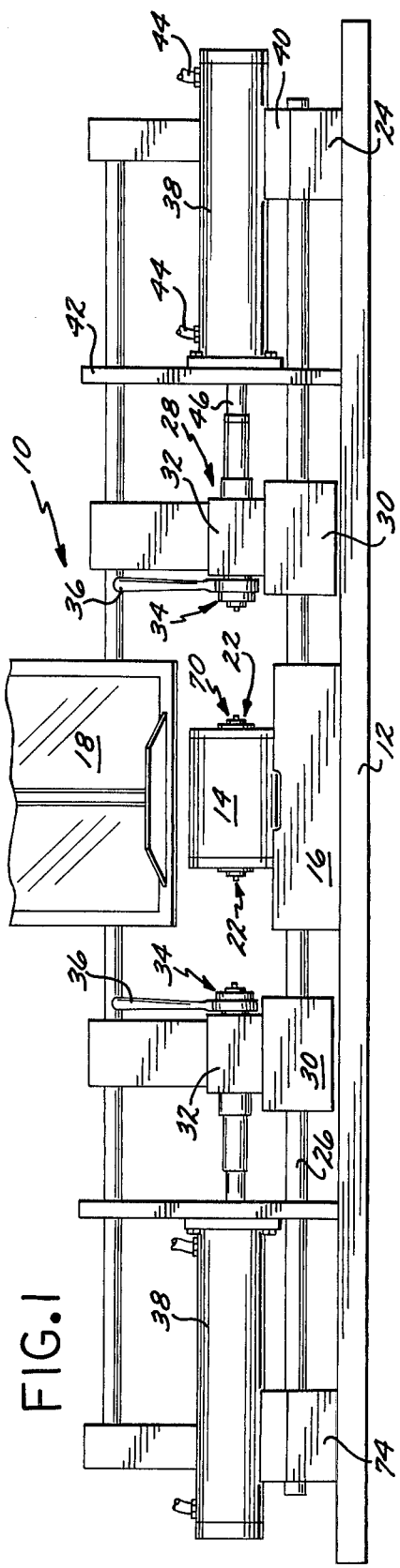
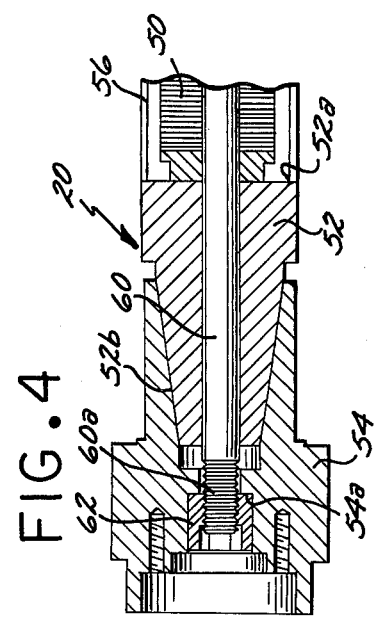
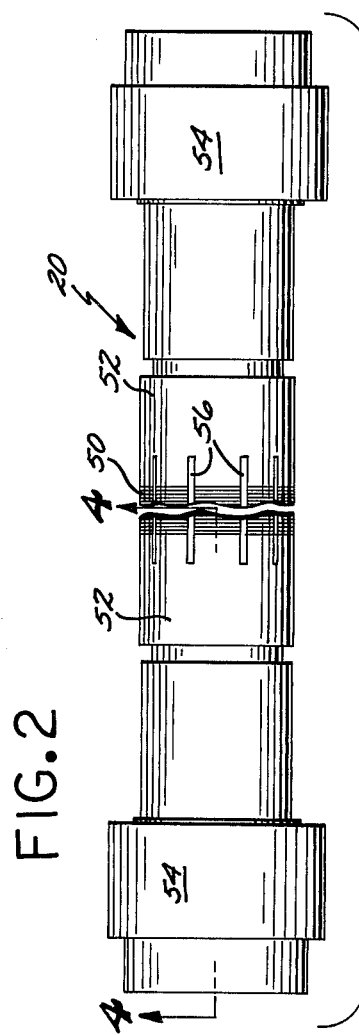
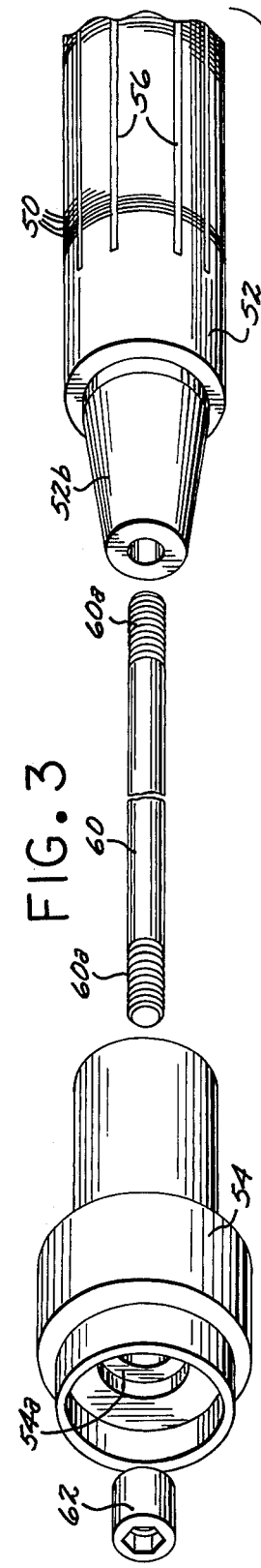

HIGH SPEED ROTOR FOR FRICTION WELDING SYSTEMS

The present invention relates generally to induction motors, and more particularly to such motors as are capable of operating at extremely high speeds.

For certain functions, it is necessary to have a motor which can attain extremely high operating speeds and yet can withstand the application of certain forces which tend to disrupt or bend the actual axis of rotation. That is, in performing certain types of industrial operations, it is necessary to rotate a workpiece at an unusually high rate of speed, and then apply to such workpiece forces which tend to cause bending or warpage of the axis of rotation.

On such application is found in the inertia welding technology where a first workpiece is caused to rotate and thereafter a second workpiece is brought into engagement with the first so as to create frictional forces which ultimately provide the energy for effecting a weld. Typically, the second workpiece is moved along the axis of rotation of the first workpiece. Any imperfections in the size, shape or direction of relative travel of the workpieces causes force components which are not parallel to the axis of rotation of the first workpiece or rotor and this causes the rotor to be bent out of its optimum position. If the rotor and workpiece have been rotating at a high speed, the imbalance in weight distribution which results from such force components can create destructive mechanical vibrations such that the rotor may disintegrate.

Attempts have been made to provide optimum bearing supports for the rotor to urge the latter to a given, fixed axis of rotation. However, such mechanical support means are capable of being violated if sufficient non-axial force is applied to the rotor such that strong non-axial force components result.

In view of the shortcomings of prior induction motor rotors, it is an object of the present invention to provide a rotor which is capable of withstanding relatively high bending moments and which can attain a relatively high rotational speed.

Another object of the present invention is to provide an induction motor rotor as characterized above which is of relatively small outside diameter so as to have minimal rotational inertia, but wherein all of the components of the rotor contribute to the structural integrity and strength thereof.

Another object of the present invention is to provide an induction motor rotor as characterized above wherein the electrical and magnetic components become structural components without appreciably detracting from the electrical and magnetic characteristics thereof.

Another object of the present invention is to provide an induction motor rotor as characterized above wherein a relatively small tension member is operable to place a plurality of magnetic laminations in compression to act as considerably larger structural support members.

A further object of the present invention is to provide an induction motor rotor as characterized above which utilizes rotor end members for transmitting the force generated in a relatively small tension member radially outwardly to enhance the bending strength of the rotor.

A further object of the present invention is to provide an induction motor rotor as characterized above which is simple and inexpensive to manufacture and which is rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a side elevational view of an inertia welding system which utilizes an induction motor made in accordance with the present invention;

FIG. 2 is a fragmentary side elevational view of the rotor for the induction motor of FIG. 1;

FIG. 3 is an exploded perspective view of a portion of the rotor of FIG. 2; and

FIG. 4 is a fragmentary cross sectional view of a portion of said rotor, taken substantially along line 4—4 of FIG. 2 of the drawings.

Like reference characters indicate corresponding parts throughout the several views of the drawings.

Although, as will be readily apparent to those persons skilled in the art, the present invention has particular application to the field of inertia welding, it pertains more broadly to any application wherein high speed rotation is required and non-axial forces are encountered on a rotor. This fact will become more apprent throughout the description of the instant invention.

Referring to FIG. 1 of the drawings, there is shown therein an inertia welding system 10 mounted on a table or platform 12. Basically, the system 10 is intended to rotate a first workpiece at a relatively high rate of speed, and, therafter, to bring a second but non-rotating workpiece into contact therewith so as to generate sufficient heat, by means of the friction forces therebetween, to affect a strong weld.

To accomplish this, an induction motor 14 which may be of the squirrel cage type or design, is mounted on a block or support 16.

Motor 14 is provided with a housing 18, a stator (not shown in the drawings) and a rotor 20, which will hereinafter be described in greater detail. The construction of the stator of motor 14 is in no way unusual or out of the ordinary and, as indicated above, may be of any appropriate design so as to provide a rotating magnetic field for cooperation with rotor 20.

The opposite ends of rotor 20 are provided with workpiece holders or chucks 22 which firmly grip individual workpieces to affect high speed rotation thereof as will hereinafter become more apparent.

Mounted on platform 12 by means of support blocks 24 are guide rails 26 whereon are slidably mounted chuck assemblies 28. Each such assembly 28 is provided with a support member 30 whereon is provided a block 32 which carries a chuch 34 which, as shown in FIG. 1 of the drawings, may be manually operated by means of a handle 36. As will be readily apparent to those persons skilled in the art, the chuck assemblies 28 may take substantially any desired form, the only requirement being that there be a chuck for firmly holding a workpiece for movement into engagement with the rotating workpiece as will hereinafter be explained in greater detail.

For effecting rectilinear movement of each chuck assembly 28, there is provided at opposite ends of the inertia welding system, a hydraulic actuator 38. Each actuator is mounted relative to the platform 12 by means of support members 40 and 42, and suitable conduits 44 are provided for conducting fluid into the actuator so as to move a piston which is connected to a shaft 46. As shown in FIG. 1 of the drawings each shaft 46 is connected to the respective chuck assembly 28 to provide movement thereof in accordance with the operation of actuator 38.

FIG. 1 further shows a shield 48 for protection of the operator of the inertia welding system 10.

With the chuck assemblies 28 in their retracted positions (as shown in FIG. 1), workpieces are fixed to rotor 20 in the chucks 22 in the opposite ends thereof. Then, appropriate workpieces are firmly secured in the chuck assemblies 28 — shown most clearly in FIG. 1.

Induction motor 14 is then energized and brought up to speed. The actual speed required is dependent upon many different factors including the size and type of material being welded.

Basically, inertia welding involves rotating a first workpiece at a given rotational velocity so as to generate therein the proper amount of kinetic energy, and thereafter moving a second non-rotating workpiece into engagement with the rotating workpiece. The result is that the energy generated in the first workpiece is converted into frictional energy due to the rubbing between the several workpieces, such friction being converted into heat energy which causes the metal workpieces to reach a plastic condition to form a bond. When the workpieces are allowed to cool while in a fixed relative position, a firm homogenous weld results.

In the inertia or friction welding of small diameter pieces such as the several components of a rivet, bolt, or other type of fastener, it is necessary to rotate the first workpiece at a relatively high rate of speed in order to generate sufficient heat to make a weld over the relatively small friction area. With parts or workpieces on the order of less than one-quarter of an inch in diameter it has been found necessary, with certain types of metals and alloys, to have the first workpiece rotate as fast as 100,000 revolutions per minute. Only then can a proper weld be made with the relatively small friction area and the relatively small average or mean radius of the engaged surfaces.

If the parts to be welded are considerably larger, the average or mean radius of the friction surfaces is so large that the average lineal speed is sufficient at considerably lower rotational speeds to generate the necessary friction and heat to accomplish the plastic state.

With the requirement for extremely high rotational speeds, on the order of 100,000 rpm, the further requirement or rigidity or strength in rotating the workpiece about a precise axis is a further limitation. That is, after the rotor 20 is brought to the desired rotational speed, the hydraulic actuators 38 of FIG. 1 are suitably energized to move the several chuck assemblies 28 toward the motor 14. Such movement is along the axis of rotation of rotor 20 and causes the non-rotating workpieces to engage the rotating workpieces.

The rotor 20 is provided with a chuck at each of its opposite ends, and a non-rotating workpiece is caused to substantially simultaneously engage each of these oppositely disposed workpieces so that the forces thus created are substantially equal and opposite. This is desirable since it is very difficult to provide suitable bearing supports for a high speed rotational rotor which can also withstand some axial forces. That is, in order to properly support a high speed rotor special bearings are required, but they are not capable of withstanding any appreciable amount of axial force. For this reason, certain concepts of having the rotor "float" are utilized to prevent buildup of axial forces which may disrupt operation of the support bearings.

Ideally, however, the various non-rotatable workpieces should engage the rotating workpieces simultaneously. Also, ideally, there should be no imperfections in the material being welded, particularly in the surfaces which are brought into engagement. However, such ideal situations do not occur and, as a result, the workpieces do not properly align and mate with each other. This creates non-axial force components which are normal to the axis of rotation of rotor 20 and tend to bend or twist the rotor while it is rotating at such high speed. As a result, the several workpieces become welded together in misaligned relative positions. That is, such forces and corresponding bending of the rotor prevent the rivet or fastener parts from being welded together in the desired contiguous relationship.

To assist in preventing the rotor from bending or twisting under reasonable bending loads, the rotor shown in the drawings has been devised.

Referring to FIG. 4 of the drawings, there is shown therein a rotor 20 comprised of a plurality of laminations 50. Each such lamination is approximately 0.020 inches thick and is made of a high silicon low carbon steel. The outer diameter of each lamination is from three-eighths of an inch to one inch depending upon various factors.

In order to obtain the high rotational speed described above in a relatively short period of time so that successive welds can be performed in rapid succession, it is necessary that the outer diameter of the rotor be relatively small.

At opposite ends of the series of laminations 50, there is provided a rotor end piece 52 formed of substantially any kind of steel. Each end piece 52 is generally cylindrical in construction and is provided with an annular groove or cutout 52a. Although not directly related to the instant invention each end piece is further provided with a tapered end portion 52b which cooperates with a suitable conical opening in a bearing member 54 which carries a chuck 22, referred to above with respect to FIG. 1.

As shown most clearly in FIGS. 2 and 3 of the drawings, the multiplicity in laminations 50 are provided with aligned peripheral grooves 56 which are further aligned with grooves which extend into the end pieces 52 in communication with the annular cutout 52a formed in each end piece. Such grooves 56 extend parallel to the axis of rotation of the rotor and are narrower at the periphery of each lamination than they are a predetermined distance from such periphery. Further, the number and spacing of such slots or grooves 56 is such as to provide the proper number of magnetic paths in the rotor for proper cooperation with the rotating magnetic field of the stator.

A higher strength copper alloy is cast in place in the grooves 56 and the annular cutout 52a in the end pieces 52. This results in an electrically conductive copper bar in each of the grooves, on the order of 1/16 to ⅛ inch by 3/32 to 3/16 inch in cross section, with each such conductor being connected electrically to every other conductor in the rotor by the copper end rings cast in cutouts 52a.

Normally the laminations 50 are merely retained in adjacent relation either by the copper conductors or by other appropriate means. However, in order to provide the instant rotor 20 with sufficient bending strength, a relatively small tension rod 60 extends through an appropriate centrally located through opening in each of the laminations 50 as well as the end pieces 52. Such tension rod 60 is made of high nickel steel and is heat treated by precipitation to provide a tensile strength in excess of 300,000 psi. Such rod is on the order of ⅛ inch to a ¼ inch in diameter and its opposite ends threaded as at 60a to receive a fastening nut 62. Nut 62 operates against a shoulder 54a in chuck retaining member 54 as seen in FIG. 4 of the drawings.

Due to the use of maraging steel for rod 60, it is possible to provide a tensile load of approximately 300,000 psi in the rod shown in FIG. 4. To accomplish this, the several fastening nuts 62 at the opposite ends of the rod 60 are operated so as to draw together all of the assembled parts.

This places the end pieces 52 as well as the multiplicity of laminations 50 in corresponding compression. As a result, each lamination as well as the several end pieces 52 become structural members, and materially increase the bending strength of the entire rotor.

In order to maintain the small outer diameter of the rotor (to facilitate acceleration and deceleration) and to preserve the maximum electrical and magnetic characteristics of the rotor of an induction motor, a relatively small diameter tension rod 60 is used to insure that the laminations contain a maximum amount of iron. However, by placing such rod 60 under high tension, the laminations and the end pieces become structural members which enlarge the effectiveness of the rod 60 in stiffening the entire rotor structure.

Thus, with the above described rotor structure, the mating engagement of the workpieces during inertia welding is improved considerably so that the resulting welds are more accurate and desirable. Any tendency for forces normal to the axis of rotation of the rotor to bend the rotor is effectively repelled by the rigidity and strength of the rotor 20 against bending. By utilizing suitable accurate bearings, an improved welding system is provided.

It is thus seen that the present invention provides an improved induction motor rotor for use in an inertia welding system.

We claim:

1. A friction welding system comprising in combination, an induction motor having a stator and a high speed rotor adapted to retain and rotate a first workpiece at approximately 70,000 to 100,000 revolutions per minute, a rectilinearly movable chuck assembly operable to retain a second workpiece and to move the same into engagement with said first workpiece, said rotor of said induction motor having a plurality of relatively soft iron laminations contiguously arranged and a rotor end assembly at each end thereof, each of said end assemblies comprising an end member adjacent said laminations in contiguous relation therewith and formed with an outwardly extending frusto-conical surface and a bearing member formed with a complementally shaped surface for mating with said frusto-conical surface and having an external annular bearing surface, and means operatively associated with said laminations and end assemblies to apply thereto a relatively high compression to cause said bearing members to be drawn toward each other to urge each pair of mating frusto-conical surfaces into tight mating engagement and said laminations therewith into high compression engagement to be structural members tending to prevent bending of said rotor during high speed rotation on said annular bearing surfaces.

2. A friction welding system according to claim 1 wherein said means for compressing said laminations comprises a tension rod through said laminations and end assemblies.

3. A friction welding system according to claim 2 wherein said tension rod is formed of maraging steel having a tensile strength greater than 300,000 pounds per square inch.

4. A friction welding system according to claim 3 wherein said laminations and end assemblies are formed with contiguous through openings wherein said rod is positioned, said rod having a diameter approximating one-quarter the diameter of said laminations whereby said compressive force on the latter increases the bending strength of said rotor by increasing the bending moment to the diameter of said laminations.

* * * * *